United States Patent [19]
Asada

[11] Patent Number: 5,487,609
[45] Date of Patent: Jan. 30, 1996

[54] SLIDE UNIT FOR LINEAR MOTION

[75] Inventor: Makoto Asada, Kurokawa, Japan

[73] Assignee: THK Co., Ltd., Tokyo, Japan

[21] Appl. No.: 339,280

[22] Filed: Nov. 8, 1994

Related U.S. Application Data

[63] Continuation of Ser. No. 961,721, filed as PCT/JP92/00610, May 13, 1992, abandoned.

[30] Foreign Application Priority Data

May 13, 1991 [JP] Japan .................. 3-042344 U

[51] Int. Cl.⁶ ............................................ F16C 29/06
[52] U.S. Cl. .................................... 384/18; 384/45
[58] Field of Search .......................... 384/45, 44, 43, 384/18; 464/168

[56] References Cited

U.S. PATENT DOCUMENTS 4,527,842  7/1985  Teramachi ................... 384/45

FOREIGN PATENT DOCUMENTS 58-95481  12/1984  Japan .
61-48009  10/1986  Japan .
62-42126  10/1987  Japan .

Primary Examiner—Lenard A. Footland
Attorney, Agent, or Firm—Armstrong, Westerman, Hattori, McLeland & Naughton

[57] ABSTRACT

In a linear motion slide unit, it is usable under a heavy load with high precision, or in a light load, an over-stroke amount can be made large. The linear motion slide unit comprises an elongated inner rail having high rigidity, a pair of outer rails attached to be reciprocally movable in an axial direction of the inner rail, and linear motion guides of endless track type structure disposed to be slidable with respect to the inner rail and fixed to the outer rails. A bearing body of the linear motion guide has also high rigidity, and accordingly, the balls mounted inside the endless track is applied with a large preload.

10 Claims, 5 Drawing Sheets

SLIDE UNIT FOR LINEAR MOTION

This application is a continuation of application Ser. No. 07/961,721 filed as PCT/JP92/00610, May 13, 1992, now abandoned.

TECHNICAL FIELD

This invention relates to a slide unit for a linear motion to be used for a slide portion such as a drawer, and more particularly to a linear motion slide unit with high performance for a heavy load.

BACKGROUND TECHNOLOGY

In office tables, peripheral devices for computers, copying machines, measuring instruments, telecommunication equipments, medical instruments, various office equipments, and the like, slide portions are utilized by over-stroking them over entire lengths of rails.

A slide unit for linear motion is utilized as a mechanical element for smoothly and precisely performing such sliding operation of the slide portion.

FIG. 4 represents a typical one example of a slide unit 50 for the linear motion of a conventional structure.

The linear motion slide unit 50 is generally composed of a pair of inner rails 60, 60 secured back to back to each other, a pair of outer rails 70, 70 attached to the inner rails 60, 60 respectively to be axially reciprocal, a number of balls 80 interposed between corresponding inner and outer rails 60 and 70 in rolling contact to the rails, and a retainer 90 for holding the balls 80 in a predetermined positional relationship.

The inner and outer rails 60 and 70 are formed of steel plates subjected to a precise roll-forming process, and these rails 60 and 70 are formed with ball rolling grooves 61, 61 and 71, 71 on upper and lower surfaces thereof so as to oppose to each other.

The retainer 90 is formed with a number of holes 91 corresponding in numbers to the balls 80 and, hence, since the balls 80 are arranged with equal spaces with each other always, respectively, the balls 80 are free from the mutual friction, thus obtaining a smooth sliding mechanism.

Then, a case where such linear motion slide unit 50 is applied to a slide portion of a drawer of, for example, an office table will be described hereunder.

One of the paired outer rails 70 is fastened to a body 110 of the office table by means of bolt or the like and the other one of the rails 70 is fastened to a side surface of the drawer 100 of the office table by means of bolt or the like. A possible extending length of the drawer 100 is determined to be equal to an over-stroke amount of the other one of the outer rails 70 with respect to one of the outer rails 70. As shown in FIG. 5(a), it is assumed that the linear motion slide unit 50 be composed of a portion $X_1$ in which a number of balls 80 are disposed and both side slidable portions $X_2$. As shown in FIG. 5(b), when the drawer is fully drawn out, the front end of the other one of the outer rails 70 can be drawn out from the front end of one of the outer rails 70 by an amount four times of the length of the portion $X_2$. Accordingly, the over-stroke amount of the linear motion slide unit 50 is made long as the length of the portion $X_2$ is possibly extended, and in other words, as the length of the portion $X_1$, is possibly made short.

In the slide unit 50 for the linear motion, since the balls 80 are held always with equal space between adjacent ones by the retainer 90 formed by a precise pressing operation, the balls are free from the mutual friction and can be rolled smoothly.

However, in recent years, there has been required to utilize such kind of linear motion slide unit for a sliding portion on which a heavy load is applied. The described linear motion slide unit 50 is not suitable for the heavy load, and therefore, development of a linear motion slide unit capable of withstanding the heavy-load has been required.

In the case of requiring an increased over-stroke amount, as described above, the length of the portion $X_1$, will be shorten. However, in the conventional linear motion slide unit, less number of balls 80 are utilized or less amount of a preload is applied in the present technology in this art, so that there is a limit for making short the length of the portion $X_1$.

DISCLOSURE OF THE INVENTION

This invention aims to solve the problems of the prior art described above and to provide a slide unit for linear motion capable of withstanding a heavy load with high precision.

This invention is characterized by comprising an elongated inner rail, a pair of outer rails attached to be reciprocally movable in an axial direction of the inner rail and linear motion guides supported slidable with respect to the inner rail through a number of rolling members and secured to the paired outer rails, the linear motion guides being formed with endless tracks in which the rolling members are endlessly circulated.

The linear motion guides comprise a bearing body provided with rolling member rolling grooves opposing to rolling member rolling grooves formed to the inner rail and return passages for non-loaded rolling members and a pair of side covers secured to both end surfaces of the bearing body and provided with rolling member returning grooves connecting the opposing rolling member rolling grooves of the bearing body and the return passages for the non-loaded rolling members to thereby constitute endless tracks.

It is preferred that the bearing body is a block member having a U-shaped cross section having a central recessed portion into which the inner rail is inserted, and rolling member rolling grooves are formed to the bilateral inner side surfaces of the central recessed portion so as to oppose to those formed to the opposing surfaces of the inner rail.

In addition, it is preferred that the inner rail and the bearing body are formed of a material having high rigidity and a preload is applied to the rolling members.

Furthermore, it is preferred that each of the linear motion guides is provided with a preload adjustment mechanism for adjusting the preload to be applied to the rolling members.

Still furthermore, each of the preload adjusting mechanisms provided for the linear motion guide is characterized by comprising a recessed portion for adjustment formed to the central portion of a surface to which the outer rail of the bearing body is fixed and an adjustment bolt screwed in a screw hole bored to the bottom surface of the preload adjustment recessed portion through a through hole formed to the outer rail, and in that the adjustment recessed portion is pulled towards the outer rails by fastening the adjustment bolt, a moment is caused to the bearing body by this pulling force in a direction narrowing a gap between bilateral inner side surfaces of the central recessed portion to thereby apply the preload to the rolling members, and an amount of the preload of the rolling members is made adjustable in accordance with the fastening force of the adjustment bolt.

Since the endless track is formed, it is possible to increase in number the rolling members withstanding the load, thus withstanding the heavy load. Furthermore, the rigidity of the linear motion guide can be improved by applying the preload to the rolling members mounted in the endless track, and accordingly, the rigidity of the slide unit for the linear motion can be improved.

Since the linear motion guide having such endless track is utilized, the load withstanding ability to the heavy load can be increased, and in the case of the over-stroke under the heavy load, the slide unit can be utilized without causing a gap between the respective members, and that is, in the case of the heavy load, precise and smooth sliding motion can be achieved.

Furthermore, in the case of the light load, the effective length of the linear motion guide can be shortened, and accordingly, the amount of the over-stroke can be made large.

Particularly, by applying the preload to the rolling members, the load withstanding ability against the heavy load can be improved, so that a more large preload can be applied by constituting the inner rail and the bearing body by a member having high rigidity.

BRIEF DESCRIPTION OF THE DRAWINGS

FIG. 2 is a front view, partially eliminated, of the linear motion slide unit.

BEST MODE FOR EMBODYING THE INVENTION

The details of the linear motion slide unit according to this invention will be described hereunder with reference to the accompanying drawings.

Figure 1:
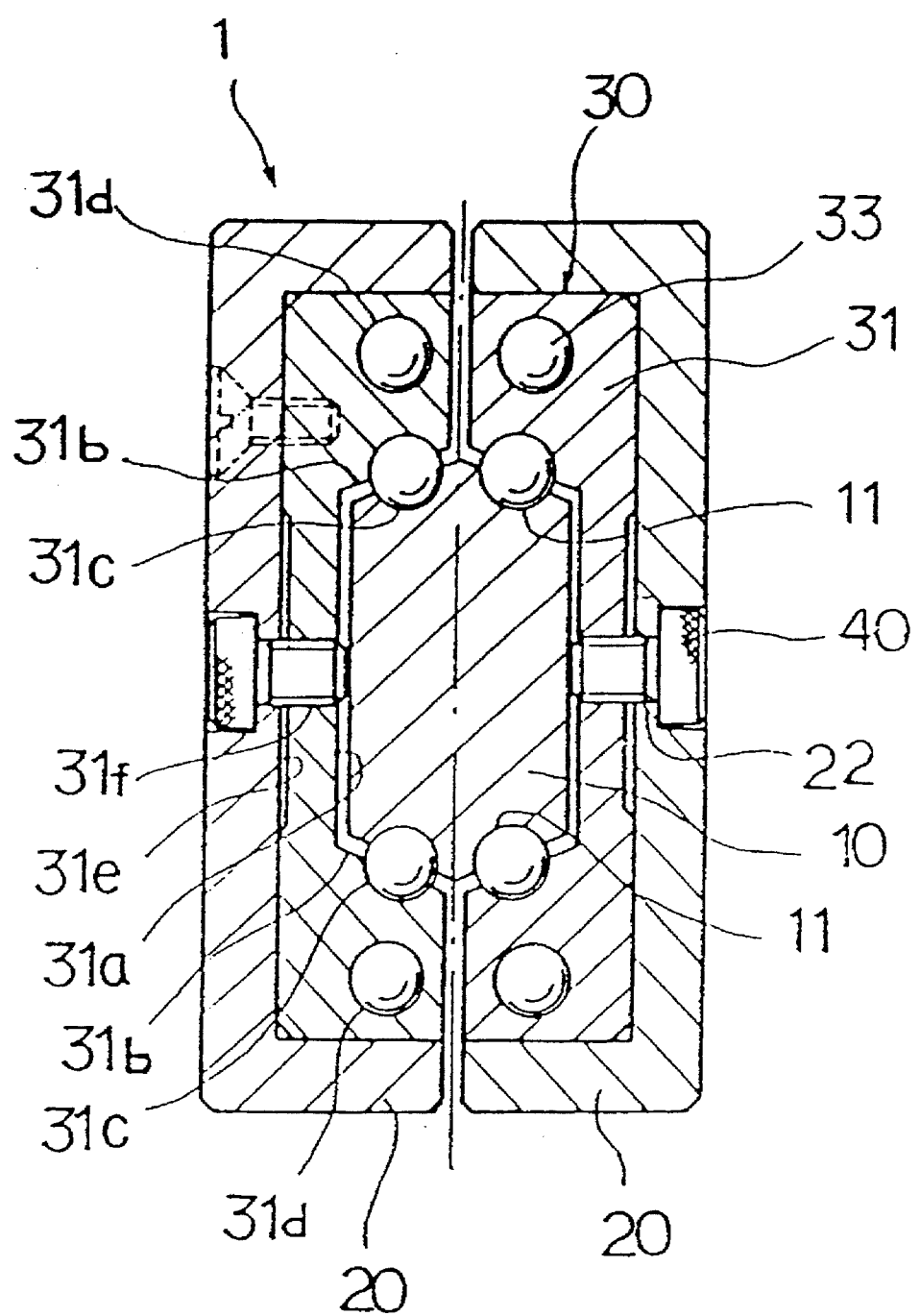
FIGS. 1 and 2 represent a linear motion slide unit according to one embodiment of this invention, in which righthand half of the linear motion slide unit of FIG. 1 is a view taken along the line A—A of FIG. 2 and a lefthand half thereof is a view taken along the line B—B in FIG. 2.
Figure 2:
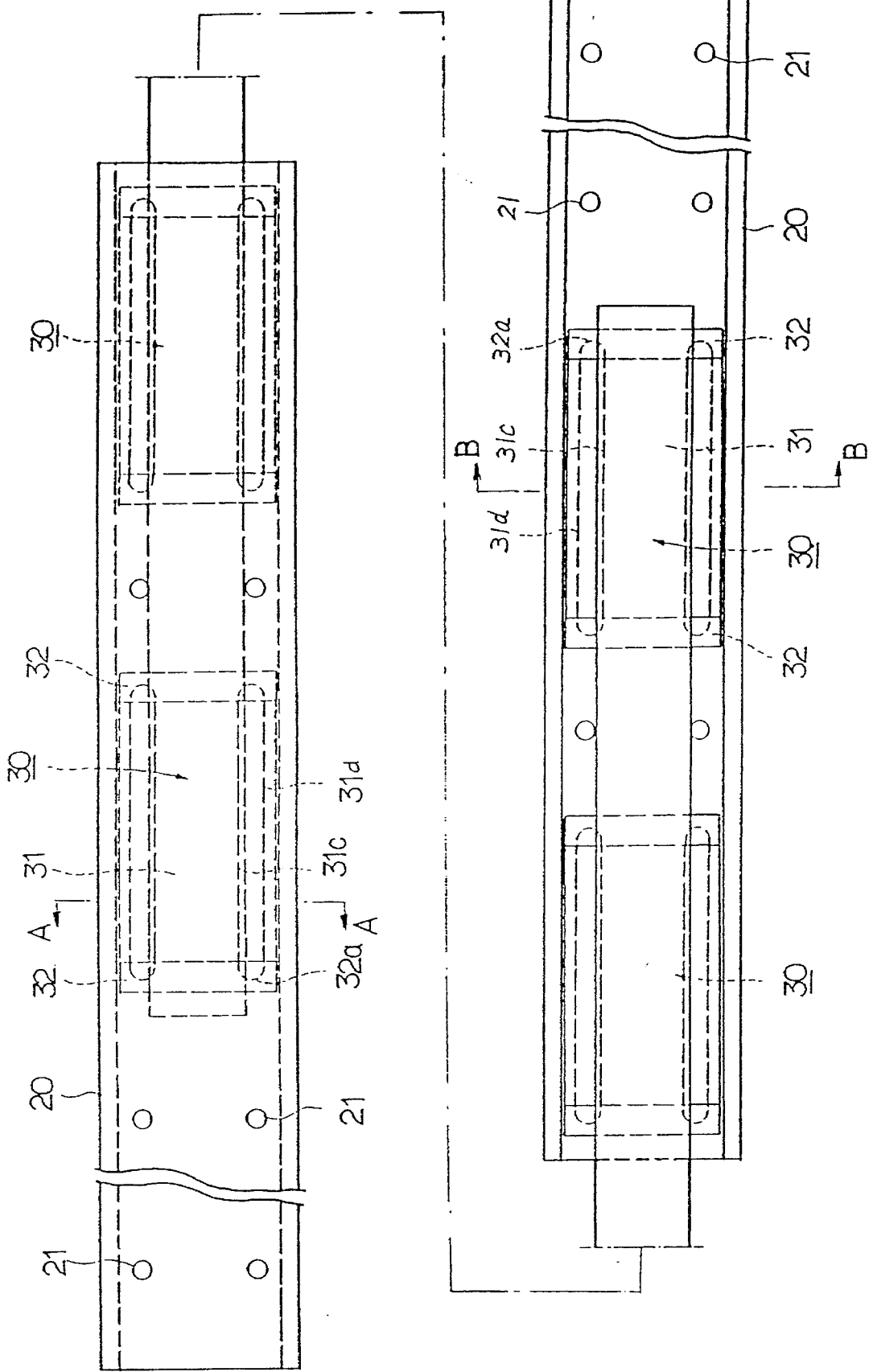

With reference to FIGS. 1 and 2, one embodiment of the linear motion slide unit of this invention is shown.

As shown in these figures, a linear motion slide unit 1 of this invention generally comprises an elongaged inner rail 10 having high rigidity, a pair of outer rails 20 attached to be reciprocally movable in an axial direction of the inner rail 10, and linear motion guides 30 secured fixedly to the outer rails 20 and slidably to the inner rail 10.

The inner rail 10 is manufactured by cold-drawing a steel material. The inner rail 10 is formed with two rows of ball rolling grooves 11 on its upper and lower surfaces. The ball rolling grooves 11 are subjected to hardening treatment to apply sufficient hardness.

Each of the outer rails 20 has substantially a U-shaped cross section and has a longitudinal length slightly larger than that of the inner rail 10. Each of the outer rails 10 is formed with a plurality of holes 21 for attachment and the outer rail 20 is secured to an office table body or a side surface of a drawer, for example, by means of bolts. The central portion of the outer rail 20 is formed with a through hole 22 provided with a back facing through which an adjustment bolt 40 for adjusting the preload amount to the balls, as described hereinlater.

Linear motion guides 30 disposed between the inner rail 10 and the respective outer rails 20 are of endless track type structure having high rigidity. In the illustrated embodiment, two linear motion guides 30 are mounted with respect to one outer rail 20 as shown in FIG. 2.

The linear motion guide 30 is itself known in this art field and comprises a bearing body 31 made of iron steel, a pair of side covers 32, 32 mounted in abutment to both end surfaces of the bearing body 31 and a number of balls 33 as rolling members.

The bearing body 31 is manufactured by cold-drawing a steel material. A recessed portion 31a for receiving the inner rail 10 is formed to a central inside portion of the bearing body 31. Ball rolling grooves 31c opposing to the ball rolling grooves 11 of the inner rail 10 are formed to an inclining surface 31b adjacent to the recessed portion 31a. These ball rolling grooves 31c are also subjected to the hardening treatment to thereby apply sufficient hardness thereto.

Furthermore, return holes 31d for the non-loaded balls are formed to the bearing body 31 so as to penetrate it in its axial direction.

In the illustrated preferred embodiment, a central outside portion of the bearing body 31 is formed as a shallow recessed portion 31e for adjustment and a female screw hole 31f, which is screw engaged with a male screw of the adjustment bolt 40, is bored at the central portion of the recessed portion 31e. Each of the preload adjustment mechanisms is composed of this recessed portion 31e for adjustment and the adjustment bolt 40.

The side covers 32 may be cheaply formed of a dicast alloy or synthetic resin because large load is not applied to these side covers 32. The side covers 32 connect the corresponding ball rolling grooves 31c and the non-loaded ball return holes 31d, thus being provided with ball returning grooves 32a as endless tracks, respectively.

Figure 5A:
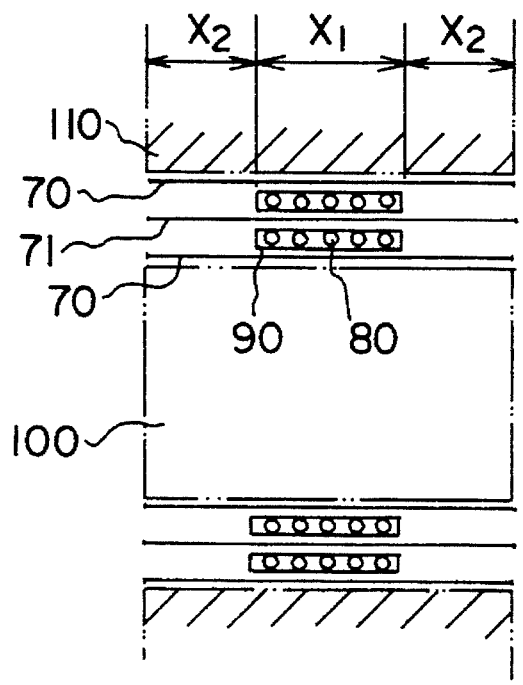
FIG. 5 is a view for the explanatory of an over-stroke amount of the linear motion slide unit.
Figure 5B:
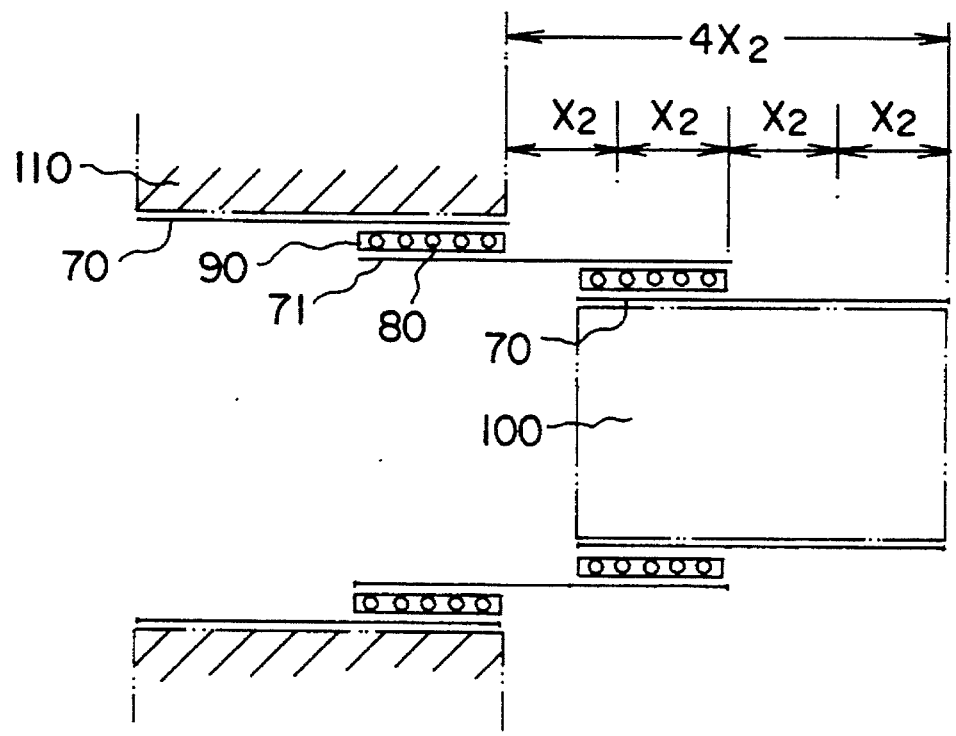

A number of balls 33 mounted in the respective endless tracks can apply a large preload for the reason that the inner rail 10 and the bearing body 31 transferring the load are made themselves of a material having high rigidity and the ball rolling grooves 11 and 31c holding the loaded balls are hardened. Accordingly, in the over-stroke use under the heavy load any gap is not substantially caused between the respective members. In the light load use, the effective length of the linear motion guide 30, corresponding to the portion $X_1$, in FIG. 5, can be shortened, thus making large the over-stroke amount, corresponding to the four portions $X_2$ in FIG. 5.

The adjustment bolts 40 are screw engaged with the female screw holes 31f of the bearing body 31 through the through holes 22 of the outer rails 20. As described before, since the shallow recessed portions 31e are formed between the outer rails 20 and the bearing body 31 to provide spaces therebetween, the inclining surfaces 31b, i.e. the ball rolling grooves 31c, are minutely moved by fastening the adjustment bolts 40 so as to approach the inner rail 10, thus adjusting the preload amount to the balls 33.

Figure 3:
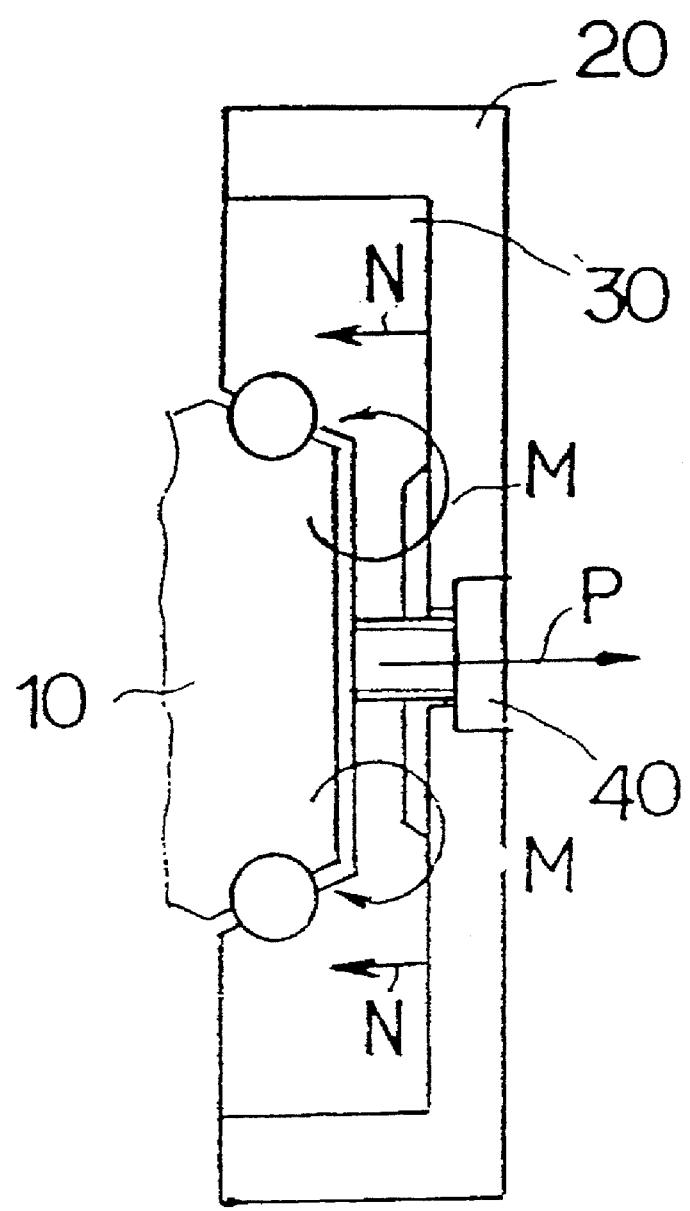
FIG. 3 is an illustration for the explanatory of the preload adjustment.
Figure 4:
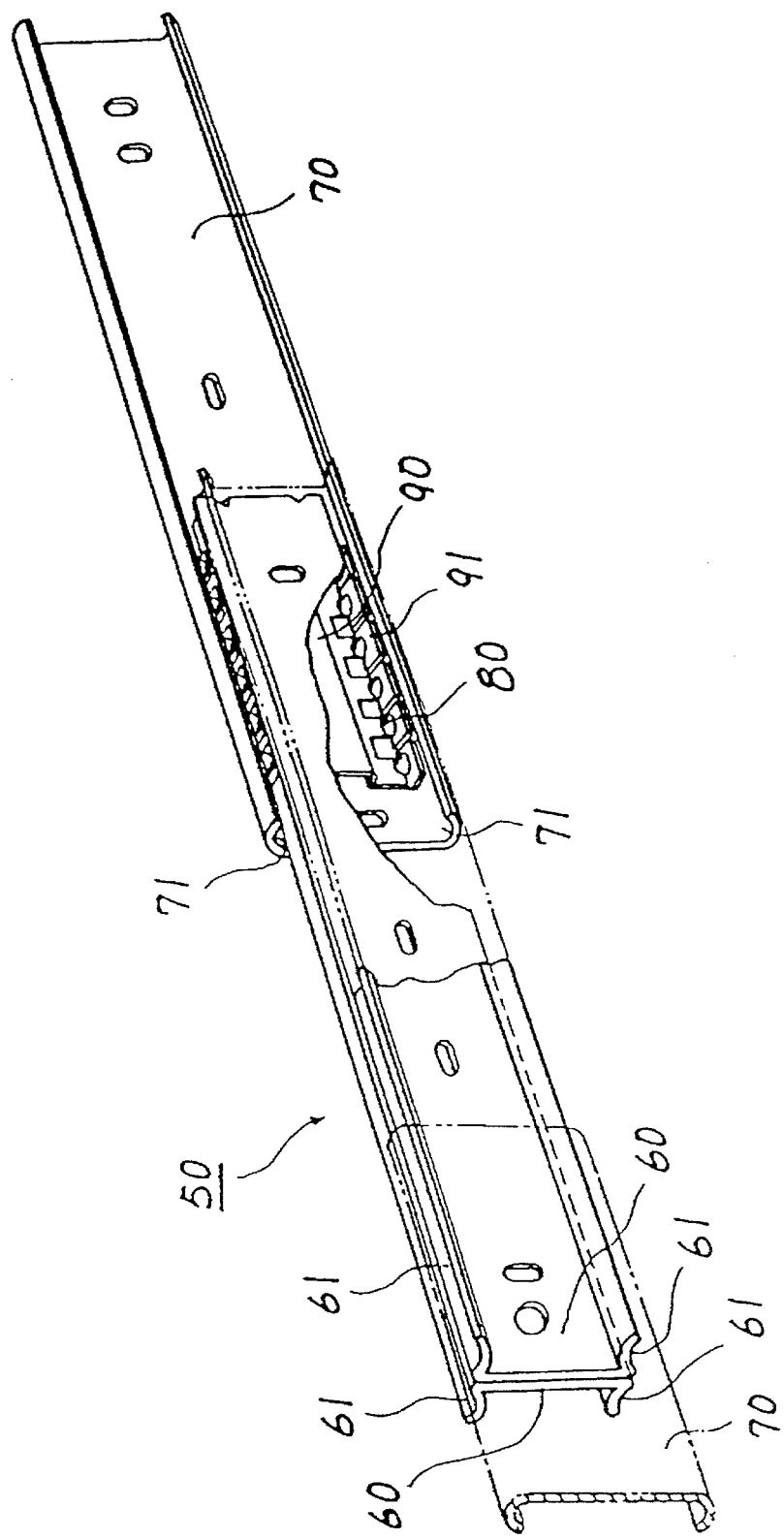
FIG. 4 is a perspective view of a conventional linear motion slide unit, partially omitted.

FIG. 3 is an illustration showing this preload adjusting condition. That is, when the recessed portions 31e of the bearing body 31 for adjustment are pulled by the fastening of the adjustment bolts 40 towards the outer rails 20 with fastening forces P, the pulling forces P and resisting forces N acting on the fixed surfaces constitute couple of forces, which causes to the bearing body 31, moments M for narrowing the bilateral inner side surfaces of the central recessed portions 31a. According to the moments the preload is applied to the balls 33 and the amount of the preload to be applied to the balls can be adjusted in accordance with the fastening amount of the adjustment bolts 40.

A method of using the linear motion slide unit of this invention is identical to that of the conventional technology, so that the details thereof are omitted herein.

POSSIBILITY OF INDUSTRIAL USAGE

As described hereinabove, in the linear motion slide unit according to this invention, it is usable for the sliding portions of office tables, computer peripheral devices copying machines, measuring instruments, telecommunication equipments, medical instruments, various kinds of office equipments, and the like, and particularly, it is preferable for the use in which a heavy load can be supported by drawing out the sliding portion so as to extend over the entire length of the rail, that is, in the over-stroke condition.

I claim:

1. A linear motion slide unit comprising:

an elongated inner rail;

said elongated inner rail having at least one first side rolling member groove extending along the length of said inner guide rail on a first side of a width of said inner guide rail;

said elongated inner guide rail having at least one second side rolling member groove extending along the length of said inner guide rail on a second side, opposite to said first side, of the width of said inner guide rail;

a first outer rail attached to said first side of said elongated inner rail and reciprocally movable in an axial direction of said inner rail along said first side thereof;

a second outer rail attached to said second side of said elongated inner rail and reciprocally movable in the axial direction of said inner rail along said second side thereof;

at least one first side linear motion guide fixedly secured to said first outer rail and supported slidable with respect to the inner rail through a number of rolling members, said first side linear motion guide being formed with endless tracks in which the rolling members are endlessly circulated, said rolling members being supported along said first side rolling member groove;

at least one second side linear motion guide fixedly secured to said second outer rail and supported slidable with respect to the inner rail through a number of rolling members, said second side linear motion guide being formed with endless tracks in which the rolling members are endlessly circulated, said rolling members being supported along said second side rolling member groove; and whereby said first side linear motion guide and said second side linear motion guide each are located on opposite sides of said inner guide rail from one another.

2. A linear motion slide unit according to claim 1, wherein said linear motion guides each include a bearing body provided with rolling member rolling grooves opposing to the rolling member rolling grooves formed in the inner rail and return passages for non-loaded rolling members, and a pair of side covers secured to both end surfaces of the bearing body and provided with rolling member returning grooves connecting the opposing rolling member rolling grooves of the bearing body and the return passages for the non-loaded rolling members to thereby constitute endless tracks.

3. A linear motion slide unit according to claim 2, wherein said bearing body is composed of a block member having substantially a U-shaped cross section having a central recessed portion into which the inner rail is inserted and rolling member rolling grooves are formed to the bilateral inner side surfaces of the central recessed portions so as to oppose to those formed to the opposing surfaces of the inner rail.

4. A linear motion slide unit according to claim 3, wherein said inner rail and said bearing body are formed of a material having high rigidity and a preload is applied to the rolling members.

5. A linear motion slide unit according to claim 4, wherein said linear motion guides are provided with preload adjustment mechanisms for adjusting the preload to be applied to the rolling members.

6. A linear motion slide unit according to claim 3, wherein each of said preload adjustment mechanisms provided for said linear motion guides is characterized by comprising a recessed portion for adjustment formed to the central portion of a surface to which the outer rail of the bearing body is fixed and an adjustment bolt screwed in a screw hole bored to a bottom surface of the preload adjustment recessed portion through a through hole formed to the outer rail, and in that the adjustment recessed portion is pulled towards the outer rails by fastening the adjustment bolt, a moment is caused to the bearing body by this pulling force in a direction narrowing a gap between bilateral inner side surfaces of the central recessed portion to thereby apply the preload to the rolling members, and an amount of the preload to the rolling members is made adjustable in accordance with the fastening force of the adjustment bolt.

7. A linear motion slide unit, comprising:

an elongated inner rail, said inner rail having a pair of first side rolling grooves extending along a length of the elongated inner rail on a first side of a width thereof and having a pair of second rolling grooves extending along the length of the elongated inner rail on a second side of a width thereof;

a pair of first and second bearing bodies which are arranged on opposite sides of the elongated inner rail and which are reciprocally movable along the elongated inner rail, said first bearing body having a pair of first side rolling grooves opposing to the first side of the elongated inner rail and being reciprocally movable in an axial direction of the elongated inner rail along the first side thereof, said second bearing body having a pair of second side rolling grooves opposing to the second side of the elongated inner rail and being reciprocally movable in an axial direction of said elongated inner rail along the second side thereof, said first bearing body having a pair of endless tracks in which first side rolling members are endlessly circulated and the second bearing body having a pair of endless tracks in which second side rolling members are endlessly circulated; and a pair of first and second outer rails, said first outer rail being fixedly secured to the first bearing body opposing to the elongated inner rail and including means for applying a preload to the first side rolling members cooperating with the first bearing body, and the second outer rail being fixedly secured to the second bearing body opposing to the inner rail and including means for applying a preload to the second side rolling members cooperating with the second bearing body;

whereby said elongated inner rail and the bearing bodies to which the outer rail are secured being relatively movable to each other.

8. A linear motion slide unit according to claim 7, further comprising a pair of first and second preload adjustment members, said first preload adjustment member being arranged in said first bearing body and the first outer rail for adjusting an amount of preload to be applied to the first side rolling members and said second preload adjustment member being arranged in said second bearing body and the second outer rail for adjusting an amount of preload to be applied to the second side rolling members.

9. A linear motion slide unit according to claim 7, wherein said inner rail is relatively movable by a movable stroke thereof in a single longitudinal direction with respect to said first outer rail through said first bearing body and said second outer rail is relatively movable by a movable stroke thereof in the same said single longitudinal direction with respect to said inner rail through said second bearing body.

10. A linear motion slide unit comprising:

a first outer rail;

an elongated inner rail attached to said first outer rail and reciprocally movable in an axial direction of the first outer rail, said elongated inner rail having at least one first side rolling member groove extending along the length of the inner rail on a first side of a width of the inner rail, said elongated inner rail having at least one second side rolling member groove extending along the length of the inner rail on a second side opposite to said first side, of the width of said inner rail;

a second outer rail attached to said second side of the elongated inner rail and reciprocally movable in the axial direction of the inner rail along said second side thereof, wherein said outer rail is movable with respect to said first outer rail by a distance corresponding to a movable stroke of the inner rail with respect to the first outer rail and a movable stroke of the second outer rail with respect to the inner rail;

at least one first side linear motion guide fixedly secured to the first outer rail and supported slidable with respect to the inner rail through a number of rolling members, said first side linear motion guide being formed with endless tracks in which the rolling members are endlessly circulated, said rolling members being supported along said first side rolling member groove;

at least one second side linear motion guide fixedly secured to said second outer rail and supported slidable with respect to the second outer rail through a number of rolling members, said second side linear motion guide being formed with endless tracks in which the rolling members are endlessly circulated, said rolling members being supported along said second side rolling member groove.

* * * * *